United States Patent [19]

Okiharu

[11] Patent Number: 4,859,838

[45] Date of Patent: Aug. 22, 1989

[54] POS TERMINAL DEVICE

[75] Inventor: Ryoichi Okiharu, Kawaguchi, Japan

[73] Assignee: Omron Tateisi Electronics Co., Kyoto, Japan

[21] Appl. No.: 120,937

[22] Filed: Nov. 16, 1987

[30] Foreign Application Priority Data

Nov. 14, 1986 [JP] Japan ................................ 61-272140

[51] Int. Cl.$^4$ .......................................... G06K 15/00
[52] U.S. Cl. .................................... 235/383; 235/438; 235/462; 364/404
[58] Field of Search ....................... 235/383, 438, 462; 364/404

[56] References Cited

U.S. PATENT DOCUMENTS

| | | | |
|---|---|---|---|
| 4,563,739 | 1/1986 | Gerpheide et al. | 235/462 X |
| 4,679,154 | 7/1987 | Blanford | 235/383 X |
| 4,757,448 | 7/1988 | Takagi | 364/404 X |

Primary Examiner—David L. Trafton
Attorney, Agent, or Firm—Stevens, Davis, Miller & Mosher

[57] ABSTRACT

To improve reliability of a POS (point of sales) terminal device, an internal memory umit is further provided in addition to two external memory units having PLU (price look-up) files. Therefore, even if two external memory units develop trouble simultaneously, data (price, name, linked commodity section data and so on) related to a sold commodity are all read from the internal memory unit, whenever a bar code of the commodity is read through a scanner, before implementing registration processing. The data related to the commodities in the internal memory unit are updated whenever registration processing is implemented in dependence upon the normal external memory unit.

7 Claims, 4 Drawing Sheets

| NO. | PLU CODE | NAME | PRICE | LINKED SECTION |
|---|---|---|---|---|
| 1 | | | | |
| 2 | | | | |
| 3 | | | | |
| 4 | | | | |
| 5 | | | | |
| 6 | | | | |

POS TERMINAL DEVICE

BACKGROUND OF THE INVENTION

1. Field of the Invention

The present invention relates to a POS (point of sales) terminal device, and more specifically to a POS terminal device for reading bar codes attached on commodities by a scanner for registration processing.

2. Description of the Prior Art

There are POS (point of sales) terminal devices provided with PLU (price look-up) function. The PLU function implies that a PLU file including PLU codes (commodity identification codes) and various data (e.g. prices) related to commodities corresponding to PLU codes is previously stored in an external memory; and whenever commodities are sold, price information related to sold commodities are read from the PLU file for registration by only reading the PLU codes by a scanner.

In these POS terminal device, in case the unit or the memory which stores the PLU file is abnormal or develops trouble, it is impossible to implement registration processing. In particular, when no price labels are attached to commodities, since the operator (clerk) should go to shelves to check prices of commodities, it is impossible, in practice, to continue the registration processing; that is, the store is closed.

To overcome these problems, in usual, two PLU files are provided so that when one unit or one memory for storing one PLU file is in trouble, the POS terminal device is automatically switch to the other unit or the other memory for storing the other PLU file. However, the above-mentioned countermeasures are not yet satisfactory from the store side, thus there exists a strong demand for further improved countermeasures for safety.

SUMMARY OF THE INVENTION

With these problems in mind, therefore, it is the primary object of the present invention to provide a highly reliable POS (point of sales) terminal device which can continue registration processing even if units or memory units which store PLU files develop trouble simultaneously.

To achieve the above-mentioned object, a POS terminal device of the present invention comprises (a) a file for storing commodity identification data and data related to commodities corresponding to the commodity identification data for each commodity; (b) reading means for reading commodity identification data attached to commodities; (c) registration processing means for registration processing sold commodities on the basis of data related to the commodities read from said file whenever commodity identification data are read from said reading means; (d) storing means for storing commodity identification data and data related to commodities corresponding to the commodity identification data; (e) discriminating means for discriminating whether said file is abnormal or not whenever said reading means reads commodity identification data; and (f) controlling means for controlling operations on the basis of the discrimination result of said discriminating means.

In the POS terminal device of the present invention, the presence or absence of abnormality is discriminated whenever commodity identification data is read by the reading means. In the case of normality, data related to the commodities read from the file are stored in the storing means and registration processing is implemented on the basis of read data related to the commodites. On the other hand, in the case of abnormality, data related to commodities are read from the storing means on the basis of the commodity identification data read by the reading means and then the registration processing is implemented on the basis of data related to the commodities read from the storing means.

DETAILED DESCRIPTION OF THE PREFERRED EMBODIMENTS

Figure 1:
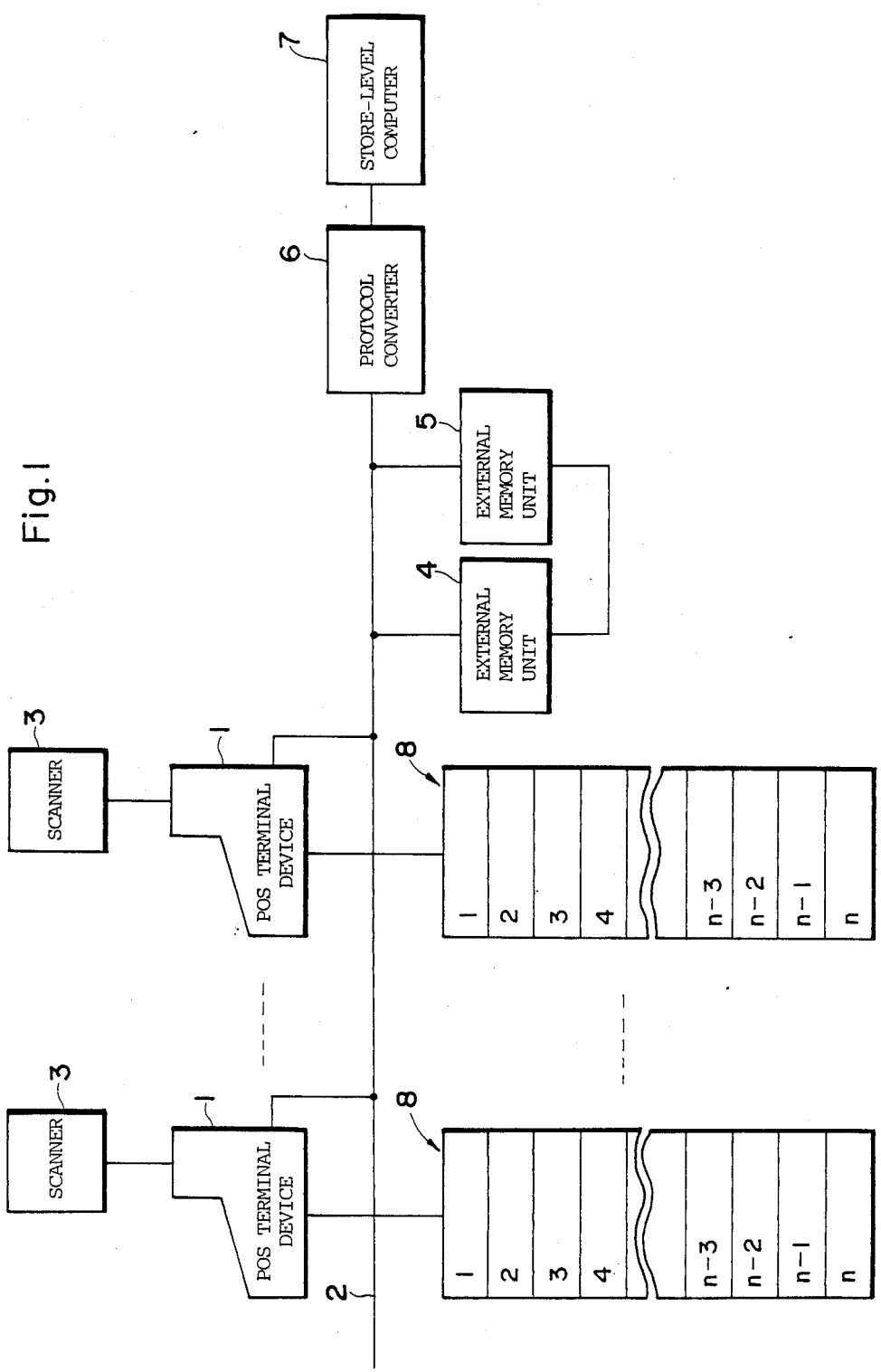
FIG. 1 is a system diagram showing a transaction processing system to which an embodiment of the POS terminal device of the present invention is applied.

FIG. 1 is a system diagram showing a transaction processing sysytem to which an embodiment of the POS terminal device of the present invention is applied. In FIG. 1, this transaction processing system includes several POS terminal devices 1. Each POS terminal device 1 is connected to a line 2 and to a scanner 3. These POS terminal devices 1 are equipped in a store to process sales or proceeds and are electronic cash registers (ECRs) for example. The scanner 3 reads bar codes (inclusive of PLU codes) attached to commodities. An external memory units 4 and 5 and a protocol converter 6 are connected to the line 2. Further, a store-level computer 7 is connected to the line 2 via the protocol converter 6. The external memory units 4 and 5 are files each of which stores PLU (price look-up codes (commodity identification data for each commodity) and data related to commodities (e.g. commodity name data, price data, linked commodity section data) corresponding to the PLU codes. In particular, the external memory unit 5 is automatically operated in case the external memory unit 4 develops trouble. The capacity of the external memory units 4 and 5 is such that data related to about 8000 commodities can be stored. The protocol converter 6 has signal conversion functions required when signals given from the POS terminal devices 1 via the line 2 or from the external memory units 4 and 5 are applied to the store-level computer 7 or when command signals given from the store-level computer 7 are applied to the POS terminal devices 1 or external memory units 4 and 5. The store-level computer 7 controls the POS terminal devices 1 and external memory units 4 and 5.

The feature of this embodiment is to further provide an internal memory unit 8 for each POS terminal device 1, so as to be operative in place of the external memory units 4 and 5 in case these external memory units both develop trouble. Whenever bar codes on commodities are read through the scanner 3, data related to the commodities and read from the external memory units 4 and 5 are stored together with the PLU codes i.e. read bar codes in the internal memory units 8. In this embodiment, the memory unit 8 has a capacity of storing data concerning about 2000 commodities, for instance.

Figures 2, 3:
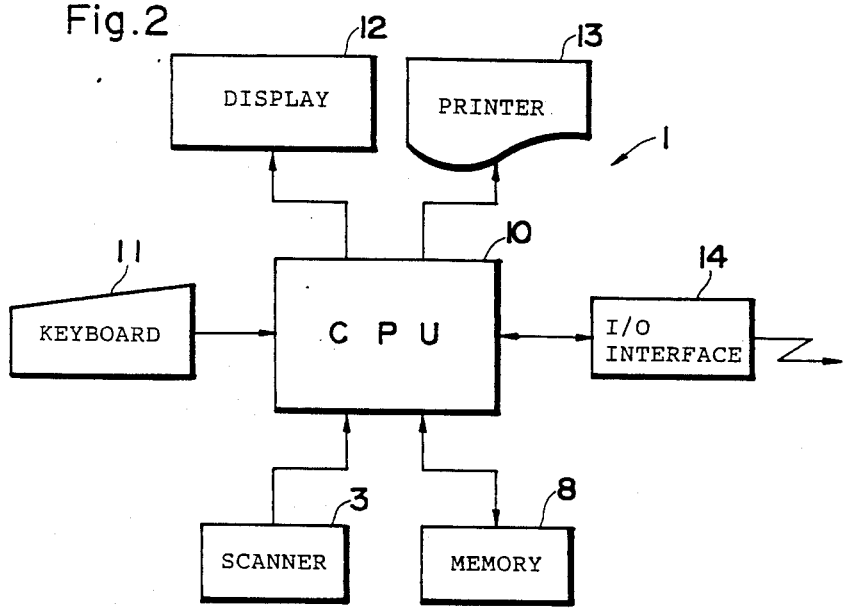
FIG. 2 is a block diagram showing an embodiment of the present invention.
FIG. 3 is a table showing memory areas in a memory unit shown in FIG. 2.

FIG. 2 is a schematic block diagram showing an embodiment of the present invention. In FIG. 2, the POS terminal device is provided with a CPU 10. To this CPU 10, a keyboard 11, a display unit 12, a printer 13, and an I/O interface 14 are connected in addition to the scanner 3 and the internal memory unit 8. In the memory unit 8, data related to commodities (as described already) and operation program for the CPU 10 (as described later with reference to flowcharts shown in FIGS. 4a and 4b) are stored. The keyboard 11 includes ten keys for entering commodity codes or price data of commodities to which no bar code is attached, and a sum total key for obtaining sum total calculations. The display unit 12 displays names of commodities and prices whenever a commodity bar code is read through the scanner 3. The printer 13 prints and issues receipts. The I/O interface 14 is connected to the line 2 to intermediate in data transmission between the CPU 10 and the external memory units 4, 5 and the protocol converter 6.

FIG. 3 shows memory areas of the internal memory unit 8 shown in FIG. 2. The memory unit 8 includes memory areas in which PLU codes, commodity name data, price data, linked commodity section data (linking data to group of commodities), etc. are stored. In this memory 8, as long as the function of the POS terminal device is not interrupted due to trouble, data related to commodities read from the external memory unit 4 or 5 are continuously stored whenever the scanner 3 reads bar codes. Therefore, in this embodiment, data related to 2000 commodities are stored in the memory 8. Where these exist no area where data related to new commodities are stored and when a bar code of a new commodity is read, the first memory area is updated by the new data, and so on.

Whenever a bar code is read through the scanner 3, the CPU 10 retrieves and reads data related to the commodity from the external memory unit 4 and implements registration processing on the basis of data related to the read commodity. However, in case the normal data related to the commodity are not read due to some trouble from the external memory unit 4, the CPU 10 reads data related to the commodity from the external memory unit 5. Further, in case the normal data are not read due to some trouble even from the external memory unit 5, data related to the commodity are retrieved from the internal memory unit 8, and the registration processing is implemented on the basis of the data read from the internal memory 8.

Figure 4A:
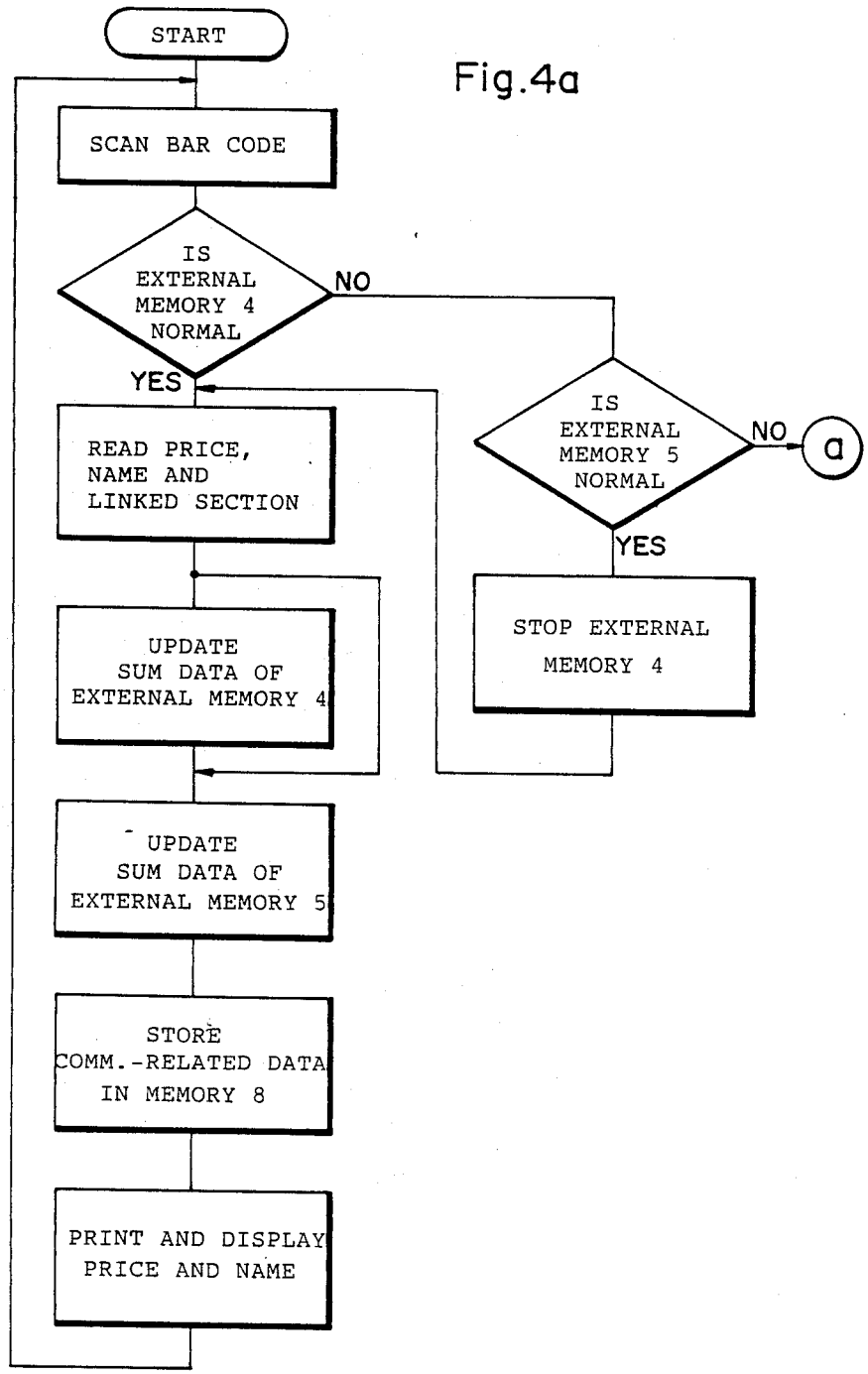
FIGS. 4a and 4b are flowcharts for assistance in explaining the operation of an embodiment of the present invention.
Figure 4B:
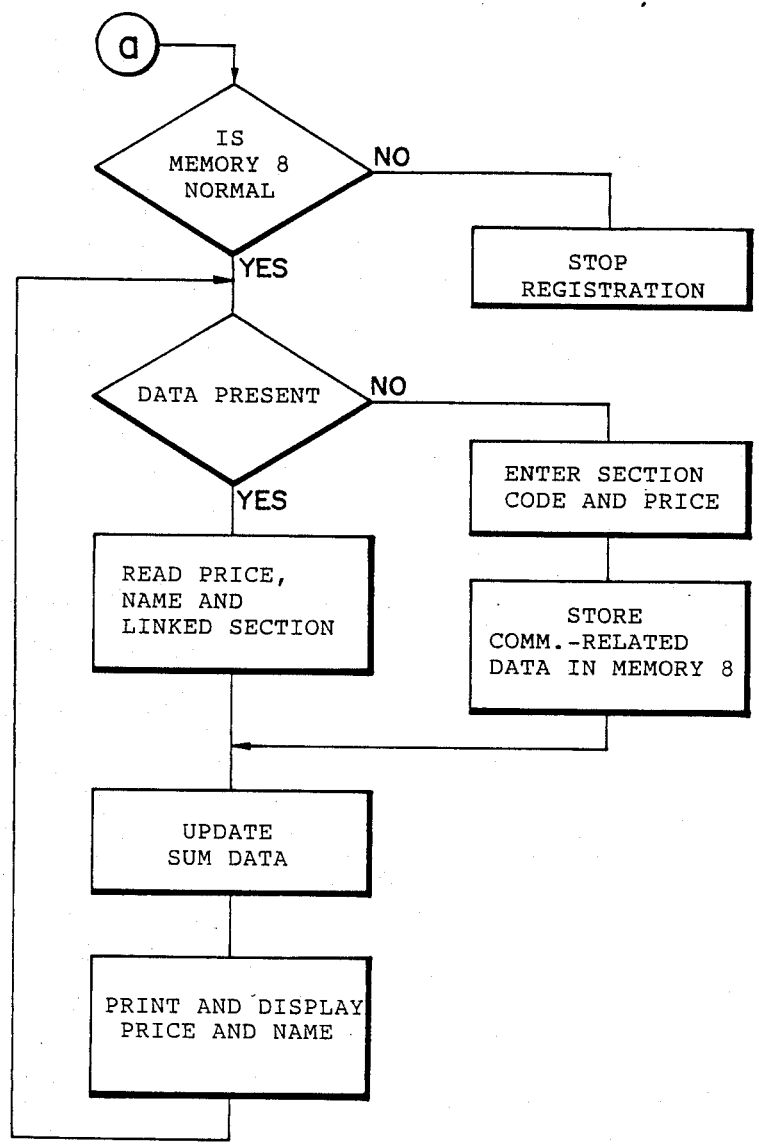

FIGS. 4a and 4b are flowcharts for assistance in explaining the operation of the present invention. The operation of the embodiment of the present invention will be described with reference to FIGS. 1 to 4b.

When a bar code is read by the scanner 3, the normality of the external memory unit 4 is discriminated. When the external memory unit 4 is determined to be normal, the price data, the commodity name and the linked commodity section data are read from the external memory unit 4. Thereafter, on the basis of the linked section data, the data in money sum total areas and number sum total areas classified according to sections (groups) and provided in the external memory unit 4 are updated. After that, the same updating are implemented for the external memory unit 5. Subsequently, data related to the commodity are searched in the memory 8 on the basis of the PLU code of the read commodity to check whether the data corresponding to the read commodity are already stored or not. When the data are not yet stored in the memory 8, the PLU code, the commodity name data, the price data and the linked section code of the commodity are stored, hostly, the price data and the commodity name data of the read commodity are printed by the printer 13 are displayed on the display unit 12.

On the other hand, in case an abnormality of the external memory unit 4 is determined, the presence or absence of abnormality is discriminated for the external memory unit 5. When the external memory unit 4 is abnormal but the external memory unit 5 is normal, the external memory unit 4 is interrupted in operation, and the registration processing is implemented by use of the external memory unit 5. The operation of the registration processing is quite the same as the above-mentioned operation, and therefore being omitted herein.

On the other hand, when the external memory units 4 and 5 are both abnormal, the abnormality of the internal memory unit 8 is discriminated. In case the memory unit 8 is abnormal, the registration processing is given up. However, when the memory unit 8 is normal, whether or not the data related to the read commodity are stored in the memory unit 8 is discriminated. When data related to the corresponding commodity are stored in the memory unit 8, the price data, the commodity name data, and linked section code are read from the memory unit 8, and the data in the money sum total areas and the number sum total areas classified according to sections (groups) which are provided in the memory unit 8 are updated on the basis of the linked section code. Thereafter, the price data, and commodity name data are printed by the printer 13 and also displayed on the display unit 12.

On the other hand, when no data related to the corresponding commodity are stored in the memory unit 8, the section code and the price data are entered through the keyboard 11 and stored in the memory unit 8. In the same way as already described, the money sum total data and the number sum total data according to commodity sections are updated, and the price data and the commodity name data are printed and displayed.

As described above, in the present embodiment, since data related to the corresponding commodities are stored in the internal memory provided in the POS terminal device, even if the external memory unit 4 (the first PLU file) and the external memory unit 5 (the second PLU file) develop trouble simultaneously, it is possible to continue registration processing only by reading bar codes.

Futher, since all the data related to commodities stored in the external memory units 4 and 5 are not stored in the internal memory unit 8 and data related to a part of commodities are stored, it is possible to reduce the number of memory chips required for the internal memory unit 8, thus reducing the cost of the POS terminal device. Further, since the contents of the internal memory unit 8 are updated at any times, no special maintenance is required to update the contents of the internal memory unit 8.

As described above, according to the present invention, whenever commodity identification data are read through the reading means, the abnormality of the file is discriminated. In the case of normality, data related to the read commodity are stored in the storing means and registration processing is executed. On the other hand, in case of abnormality, data related to the corresponding commodity are retrieved in the storing means on the basis of the commodity identification data read through the reading means, and then the registration processing is implemented on the basis of the data related to the read commodity. Therefore, in case the file develops trouble, it is possible to continue the registration processing, thus improving the reliability of the POS terminal device and services for the store and the customers.

What is claimed is:

1. A point of sales terminal device comprising:
   (a) a file for sorting commodity identification data and data related to commodities corresponding to the commodity identification data for each commodity;
   (b) reading means for reading commodity identification data attached to commodities;
   (c) registration processing means for registration processing sold commodities on the basis of data related to the commodities read from said file, whenever commodity identification data are read through said reading means;
   (d) storing means for storing commodity identification data and data related to commodities corresponding to the commodity identification data;
   (e) discriminating means for discriminating whether said file is abnormal or not whenever said reading means reads commodity identification data; and
   (f) control means for allowing said storing means to store data related to read commodities and said registration processing means to implement registration processing, whenever said discriminating means discriminates that said file is normal; and for retrieving data related to the read commodities in said storing means on the basis of commodity identification data read by said reading means and allowing said registration processing means to implement registration processing on the basis of the data related to commodities and read from said storing means, when said discriminating means discriminates that said file is abnormal.

2. The point of sales terminal device as set forth in claim 1, wherein capacity of said storing means is smaller than that of said file; and when areas in said storing means are filled with data, areas in said storing means are rewritten by new data beginning from a first area in sequence.

3. The point of sales terminal device as set forth in claim 1, which further comprises a keyboard for entering commodity codes and commodity price, and linked commodity section code when no commodity identification data are attached to commodities to be registered.

4. The point of sales terminal device as set forth in claim 1, wherein data related to commodity are price, name and linked section data.

5. The point of sales terminal device as set forth in claim 1, wherein sum totals of money and sum totals of number of sold commodities classified according to commodity sections are renewed in the registration processing.

6. A method of registration processing for sold commodities, which comprises the following steps of:
   (a) scanning a bar code attached on a commodity;
   (b) checking whether a first memory unit is normal;
   (c) if normal, reading a price and name on the basis of the scanned bar code from the first memory unit;
   (d) storing data related to the scanned commodity in a second memory unit;
   (e) if abnormal in step (c) above, checking whether the second memory unit is normal;
   (f) if normal, checking whether data related to the scanned commodity are stored in the second memory unit;
   (g) if stored, reading a price and name from the second memory unit.

7. The method of claim 6, which further comprises the following steps of:
   (a) if abnormal in step (c), checking whether another first memory unit is normal;
   (b) if the another first memory unit is normal, reading a price, name from the another first memory unit.

* * * * *